Figure 1:
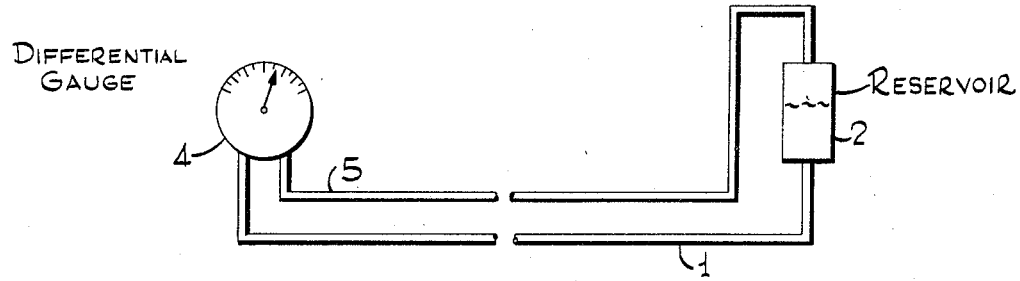

June 12, 1951      P. S. WILLIAMS      2,557,021

HYDRAULIC SYSTEM FOR MEASURING DIFFERENCES IN ELEVATION

Filed Sept. 12, 1946

Philip S. Williams Inventor

By W. O. Heilman Attorney

Patented June 12, 1951

2,557,021

UNITED STATES PATENT OFFICE 2,557,021

HYDRAULIC SYSTEM FOR MEASURING DIFFERENCES IN ELEVATION

Philip S. Williams, Tulsa, Okla., assignor to Standard Oil Development Company, a corporation of Delaware Application September 12, 1946, Serial No. 696,583

3 Claims. (Cl. 73—432)

The present invention relates to an apparatus for determining differences in altitude from point to point over an area being surveyed.

In many methods for prospecting for oil and minerals, such as the seismic method, the gravity method, and the like, differences in elevation between spaced points have to be taken into account in studying any given area. This study necessitates a survey of the area which is expensive and time consuming. Particularly in jungle country and rough terrain the survey becomes extremely burdensome and often constitutes the most expensive and time consuming part of the whole study.

By employing the apparatus of this invention, an extremely simple method for determining differences in elevation between spaced points in a given area is provided. This method involves merely the use of an elongated tube filled with a suitable fluid and the determination of the pressure difference between ends of the tube from location to location. The appartus in its entirety consists of the elongated tube filled with the fluid, with a reservoir connected at one end and a pressure gauge at the other end. Ordinarily the apparatus is employed by two operators, one carrying the reservoir and the other the pressure gauge, but, by providing the reservoir with a suitable spike, it is possible to employ the apparatus with a single operator walking over the terrain to be surveyed. The tube preferably employed for the apparatus of the present invention is one made of tough translucent plastic material. For example, a polymerized vinylidene chloride plastic such as that marketed under the trade name Saran may be employed. Plastic tubing of this type is so light that a very great length of it can be easily handled by a man. It will withstand the wear and tear to which it will be subjected in rough terrain. It does not expand or contract to any appreciable extent with changes in temperature, and, although of relatively thin wall size, is capable of withstanding considerable pressure.

The liquid used in the apparatus of the present invention may be any liquid having satisfactory properties such that it will remain liquid at a substantially constant viscosity and density in the range of temperatures encountered in surveying, have vapor pressure and density as low as feasible and not attack any part of the apparatus. Water is quite suitable for the purpose provided it is carefully deaerated before use; addition of a suitable anti-freeze will permit low temperature operation.

When employing the apparatus, one end of the system is placed at the base station, the other end is carried the distance permitted by the tubing in the selected direction and a differential pressure between the ends is observed. The whole assembly is then advanced until the rear element is at the point previously occupied by the lead element and another reading is taken. This procedure is repeated until the survey line is run, and the algebraic sum of the individual pressure readings between any two points of the line is proportional to the elevation difference between them. It is immaterial whether the pressure gauge or the reservoir end of the system is the lead end.

Figure 2:
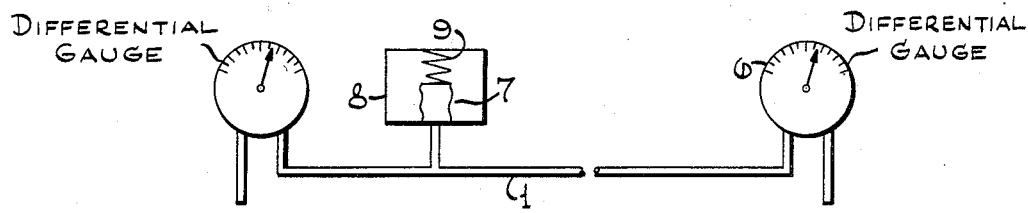
Figure 3:
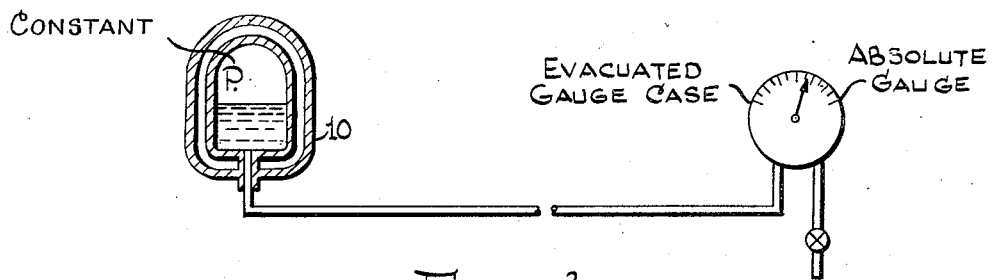

The nature of the present invention may be more clearly understood from the following detailed description of the accompanying drawing in which each of Figs. 1 to 3, inclusive, is a side elevation in diagrammatic form of a separate embodiment of the present invention.

Referring to Figure 1, a flexible tube indicated by the numeral 1 is connected to a reservoir 2 partially filled with a liquid. The other end of tube 2 is connected to one side of a differential pressure gauge 4. The other side of the differential pressure gauge is connected to a tube 5 leading to a portion of the reservoir 2 above the liquid maintained in the reservoir. By this construction any differences in atmospheric pressure between the reservoir 2 and the differential pressure gauge 4 is eliminated. As a consequence of this feature, the apparatus may be employed to determine differences in elevation greater than 25 feet, which would not be possible if the difference in atmospheric pressure corresponding to this difference in elevation were permitted to act on the reservoir and differential guage of the apparatus. The air maintained in line 5 may be held above atmospheric pressure, if desired, to prevent air entering into the liquid tube in the event of a minor leak therein. Air bubbles in the liquid line are, of course, undesirable, since they reduce in an unknown manner the effective density of the liquid.

In the arrangement shown in Fig. 2, the reservoir is replaced by a second differential gauge 6. Connected to the liquid tube is a pressure reservoir 8 including the bellows 7. The bellows is constantly held in compression by a spring 9 arranged between the bellows and a wall of the container. In the use of this embodiment the difference between the readings of the pressure gauges between stations is the significant reading, and the minimum pressure in the tube may be held always above atmospheric pressure, if desired.

In the embodiment shown in Fig. 3, an absolute pressure gauge is employed. This is the ordinary pressure gauge with the side normally exposed to the atmosphere evacuated. The reservoir 10 in this case is a double walled vessel with the space between the walls evacuated. This expedient substantially eliminates changes in volume of the gas in the space above the liquid with outside temperature, and makes this reservoir essentially a device for maintaining a constant pressure P at one end of the line. The variation in gauge reading from this pressure P then indicates the elevation difference between the ends of the line.

In order to expedite the use of the various forms of this apparatus, the pressure gauge is ordinarily calibrated in feet of elevation, this calibration depending upon the density of the liquid used. For any liquid, the calibration is effected simply by placing the pressure gauge on the ground and elevating the reservoir vertically in one foot increments with the reverse process for the negative side of the scale.

The nature and objects of the present invention having been thus described and illustrated, what is claimed as new and useful and is desired to be secured by Letters Patent is:

1. An apparatus for measuring differences in elevation between spaced points comprising a closed hydraulic system which includes a first elongated flexible tube, a body of liquid filling said first tube, a reservoir for liquid connected to one end of said first tube, a body of liquid in said reservoir communicating with said liquid in said first tube, a fluid operated differential pressure gauge having one side thereof connected to the other end of said first tube, a second elongated flexible tube capable of holding a gas under pressure, one end of said second tube being connected to the remaining side of said differential pressure gauge, and the other end of said second tube being connected to said reservoir above the body of liquid therein.

2. An apparatus for measuring differences in elevation between spaced points comprising a closed hydraulic system which includes an elongated flexible tube, a body of liquid filling said tube, two fluid operated differential pressure gauges, one attached to each end of said flexible tube, a reservoir for liquid connected to said tube at a point intermediate its ends, a body of liquid in said reservoir communicating with said liquid in said tube, said reservoir having a flexible wall portion and a rigid wall portion, and a spring arranged between said flexible wall portion and said rigid wall portion of said reservoir to hold said flexible wall portion in compression whereby liquid within said reservoir is maintained at a pressure higher than atmospheric pressure.

3. An apparatus for measuring differences in elevation between spaced points comprising a closed hydraulic system which includes an elongated flexible tube, an absolute pressure gauge connected to one end of said flexible tube, a body of liquid filling said tube, a reservoir for liquid connected to the other end of said tube comprising a double walled container with an evacuated space between the walls, a body of liquid in said reservoir communicating with said liquid in said tube, the liquid in said reservoir occupying less volume than the volume of the reservoir, and a gas under pressure in the remaining volume of said reservoir, whereby liquid in said hydraulic system is maintained above atmospheric pressure.

PHILIP S. WILLIAMS.

REFERENCES CITED

The following references are of record in the file of this patent:

UNITED STATES PATENTS

| Number | Name | Date |
|---|---|---|
| 40,028 | Ericsson | Sept. 22, 1863 |
| 762,072 | Lord | June 7, 1904 |
| 1,131,412 | Parks | Mar. 9, 1915 |
| 2,230,280 | Yeatman | Feb. 4, 1941 |
| 2,379,350 | Gubrud | June 26, 1945 |
| 2,418,593 | Martin et al. | Apr. 8, 1947 |

FOREIGN PATENTS

| Number | Country | Date |
|---|---|---|
| 506,054 | France | May 21, 1920 |